United States Patent
Armes et al.

(10) Patent No.: US 7,908,215 B2
(45) Date of Patent: *Mar. 15, 2011

(54) SYSTEM AND METHOD FOR SELECTION OF PAYMENT SYSTEMS FROM A PAYMENT SYSTEM DIRECTORY TO PROCESS A TRANSACTION

(75) Inventors: David Armes, Phoenix, AZ (US); Fred Bishop, Glendale, AZ (US); Jeffrey Alan Edelen, Glendale, AZ (US); Bill Schwarz, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1217 days.

This patent is subject to a terminal disclaimer.

(21) Appl. No.: 10/728,279

(22) Filed: Dec. 4, 2003

(65) Prior Publication Data
US 2004/0267643 A1     Dec. 30, 2004

(51) Int. Cl.
*G06Q 40/00* (2006.01)
(52) U.S. Cl. .......................................... 705/40
(58) Field of Classification Search ............. 705/35, 705/39–40, 42–44, 75–79; 725/5; 707/999; 715/210
See application file for complete search history.

(56) References Cited

U.S. PATENT DOCUMENTS

| | | | |
|---|---|---|---|
| 5,757,917 A * | 5/1998 | Rose et al. ................ | 705/79 |
| 5,815,657 A * | 9/1998 | Williams et al. ............ | 705/1 |
| 5,943,424 A | 8/1999 | Berger et al. | |
| 5,978,840 A | 11/1999 | Nguyen et al. | |
| 5,987,140 A | 11/1999 | Rowney et al. | |
| 6,061,665 A | 5/2000 | Bahreman | |
| 6,163,772 A | 12/2000 | Kramer et al. | |
| 6,246,996 B1 * | 6/2001 | Stein et al. ................ | 705/26 |
| 6,304,857 B1 | 10/2001 | Heindel et al. | |
| 6,366,893 B2 | 4/2002 | Hannula et al. | |
| 6,999,943 B1 * | 2/2006 | Johnson et al. .............. | 705/39 |
| 7,389,256 B1 * | 6/2008 | Adams et al. ............... | 705/35 |
| 2001/0011256 A1 | 8/2001 | Hannula et al. | |
| 2002/0007326 A1 * | 1/2002 | Hashimoto et al. .......... | 705/28 |
| 2002/0019739 A1 * | 2/2002 | Juneau et al. ............... | 705/1 |
| 2002/0023033 A1 * | 2/2002 | Campbell et al. ........... | 705/36 |
| 2002/0052853 A1 * | 5/2002 | Munoz ....................... | 705/79 |
| 2002/0103752 A1 * | 8/2002 | Berger et al. ............... | 705/39 |
| 2002/0103753 A1 | 8/2002 | Schimmel | |

(Continued)

OTHER PUBLICATIONS

Gamble, Richard H, "Lockbox Technology", Business Credit, v103 n1, pp. 24-30, Jan. 2001.*

(Continued)

*Primary Examiner* — Mary Cheung
(74) *Attorney, Agent, or Firm* — Snell & Wilmer L.L.P.

(57) ABSTRACT

Dynamically enabling and facilitating businesses or other entities to locate and transact with payment systems for the purpose of processing payments. A customer interacts with a supplier of an item (e.g., goods or services), selects an item for purchase, and provides the supplier with payment criteria. The supplier queries a payment system directory to locate candidate payment systems for the transaction. The supplier then interacts directly with one or more of the payment systems to partially or fully process payment for the transaction. Alternatively, the supplier interacts with a gateway service, which queries a payment system directory to locate candidate payment systems and then interacts with one or more of the payment systems to process payment for the transaction.

20 Claims, 5 Drawing Sheets

U.S. PATENT DOCUMENTS

| | | | |
|---|---|---|---|
| 2002/0111886 A1* | 8/2002 | Chenevich et al. | 705/30 |
| 2002/0128973 A1 | 9/2002 | Kranzley et al. | |
| 2002/0138361 A1 | 9/2002 | Chen | |
| 2002/0143634 A1* | 10/2002 | Kumar et al. | 705/18 |
| 2002/0156688 A1 | 10/2002 | Horn et al. | |
| 2002/0194080 A1 | 12/2002 | Lourie | |
| 2002/0194138 A1 | 12/2002 | Dominguez | |
| 2003/0004867 A1 | 1/2003 | Kight et al. | |
| 2003/0009382 A1 | 1/2003 | DArbeloff et al. | |
| 2003/0018579 A1 | 1/2003 | Litster et al. | |
| 2003/0023550 A1 | 1/2003 | Lee | |
| 2003/0069842 A1 | 4/2003 | Kight et al. | |
| 2003/0078884 A1 | 4/2003 | Bauman | |
| 2004/0064375 A1* | 4/2004 | Randell et al. | 705/26 |

OTHER PUBLICATIONS

USPTO; Advisory Action dated Sep. 10, 2010 in U.S. Appl. No. 10/611,034.

USPTO; Final Office Action dated Jun. 22, 2010 in U.S. Appl. No. 10/611,034.

USPTO; Office Action dated Dec. 28, 2009 in U.S. Appl. No. 10/611,034.

USPTO; Advisory Action dated Nov. 2, 2009 in U.S. Appl. No. 10/611,034.

USPTO; Final Office Action dated May 28, 2009 in U.S. Appl. No. 10/611,034.

USPTO; Office Action dated Jul. 18, 2008 in U.S. Appl. No. 10/611,034.

USPTO; Advisory Action dated Apr. 11, 2008 in U.S. Appl. No. 10/611,034.

USPTO; Final Office Action dated Dec. 31, 2007 in U.S. Appl. No. 10/611,034.

USPTO; Office Action dated Jul. 18, 2007 in U.S. Appl. No. 10/611,034.

* cited by examiner

SYSTEM AND METHOD FOR SELECTION OF PAYMENT SYSTEMS FROM A PAYMENT SYSTEM DIRECTORY TO PROCESS A TRANSACTION

REFERENCE TO RELATED APPLICATION

The present application claims the benefit of, and priority to, U.S. patent application Ser. No. 10/611,034, entitled "System and Method for a Payment System Directory," and filed Jun. 30, 2003, which is incorporated herein by reference.

FIELD OF INVENTION

The present invention generally relates to use of payment systems to process payments and, more particularly, to a system and method to enable entities to dynamically locate and transact with payment systems to facilitate processing payments.

BACKGROUND OF THE INVENTION

Currently, a supplier routes payment card transactions through an acquiring bank, with which it has an established business relationship. The acquiring bank then utilizes an established financial network (e.g., VisaNet, BankNet) to route the transaction to the card issuing bank. The supplier does not typically communicate directly with the issuing bank; rather, the established financial networks route transactions to issuing banks based on BIN range, without consideration of other request attributes. A need exists for a system which allows entities to dynamically locate and transact directly with payment systems to facilitate processing payments

SUMMARY OF THE INVENTION

The present invention facilitates transacting with payment systems for processing payments. The system receives from a user a request for a transaction to purchase goods or services, and payment criteria. The system queries a directory to locate one or more payment systems to process the transaction, and it returns an identification of the one or more located payment systems, if any, to process the transaction.

In another embodiment, the system facilitates transacting with payment systems for processing payments using a gateway service. The system receives from a user a request for a transaction to purchase an item (e.g., goods or services), and payment criteria for the purchase of the item. The payment criteria and an identification of the requested item are provided to a gateway service. Using the gateway service, the system queries a directory to locate one or more payment systems to process the transaction, and it returns, via the gateway service, an identification of the one or more located payment systems, if any, to process the transaction.

BRIEF DESCRIPTION OF THE DRAWINGS

The accompanying drawings, wherein like reference numerals represent like elements, are incorporated in and constitute a part of this specification and, together with the description, explain the advantages and principles of the invention. In the drawings.

DETAILED DESCRIPTION

Overview

Embodiments consistent with the present invention enable and facilitate individuals, businesses or other entities to dynamically locate and transact with payment systems to process payments. The exemplary embodiments facilitate a single on-line contact point (or reduced contact points) for suppliers to interact with any number of payment systems and to choose one or more payment systems based upon, for example, information related to a customer requesting a good or service from a supplier. The contact point may include a web site, for example, or any other point of communications. For further information related to consumer transactions, see U.S. patent application Ser. No. 9/704,379, entitled "Systems and Methods for Facilitating Commercial Transactions Between Parties Residing at Remote Locations," filed on Nov. 2, 2000, the entire contents of which are incorporated herein by reference.

In general, a customer interacts with a supplier of an item, selects an item for purchase, and provides the supplier with payment criteria. The term payment criteria includes any factors or information relating to payment for goods or services including, for example, the customer's rights through a payment system (including a return policy); when the customer is billed for purchases; prices; transaction fees; a currency exchange rate, a geographic locations of payment systems; a supplier identity; a user identity; a payment instrument selected by the user; a strength of an authentication method for the user; an amount of the purchase; a type of item being purchased; a delivery channel for the item; a supplier risk tolerance; desired payment terms; an availability of the payment systems; an optimal price for the item; optimal response attributes; contractual obligations with respect to transaction distribution arrangements for the item; specialists that handle specific classes or types of goods or services; a payment instrument; a payment currency; taxes related to payment of the item; and fees associated with payment of the item.

The supplier queries a payment system directory to locate candidate payment systems for the transaction. The supplier then interacts directly with one or more of the payment systems to partially or fully process a payment for the transaction. As used herein, a customer or supplier may include any individual, group, business, entity, software, hardware and/or the like.

In an alternate embodiment, a customer interacts with a supplier of an item, selects an item for purchase, and provides the supplier with payment criteria. The supplier interacts with a gateway service to partially or fully process a payment for the transaction. The gateway service queries a payment system directory to locate candidate payment systems and then interacts with one or more of the payment systems to process the payment for the transaction.

Figure 1:
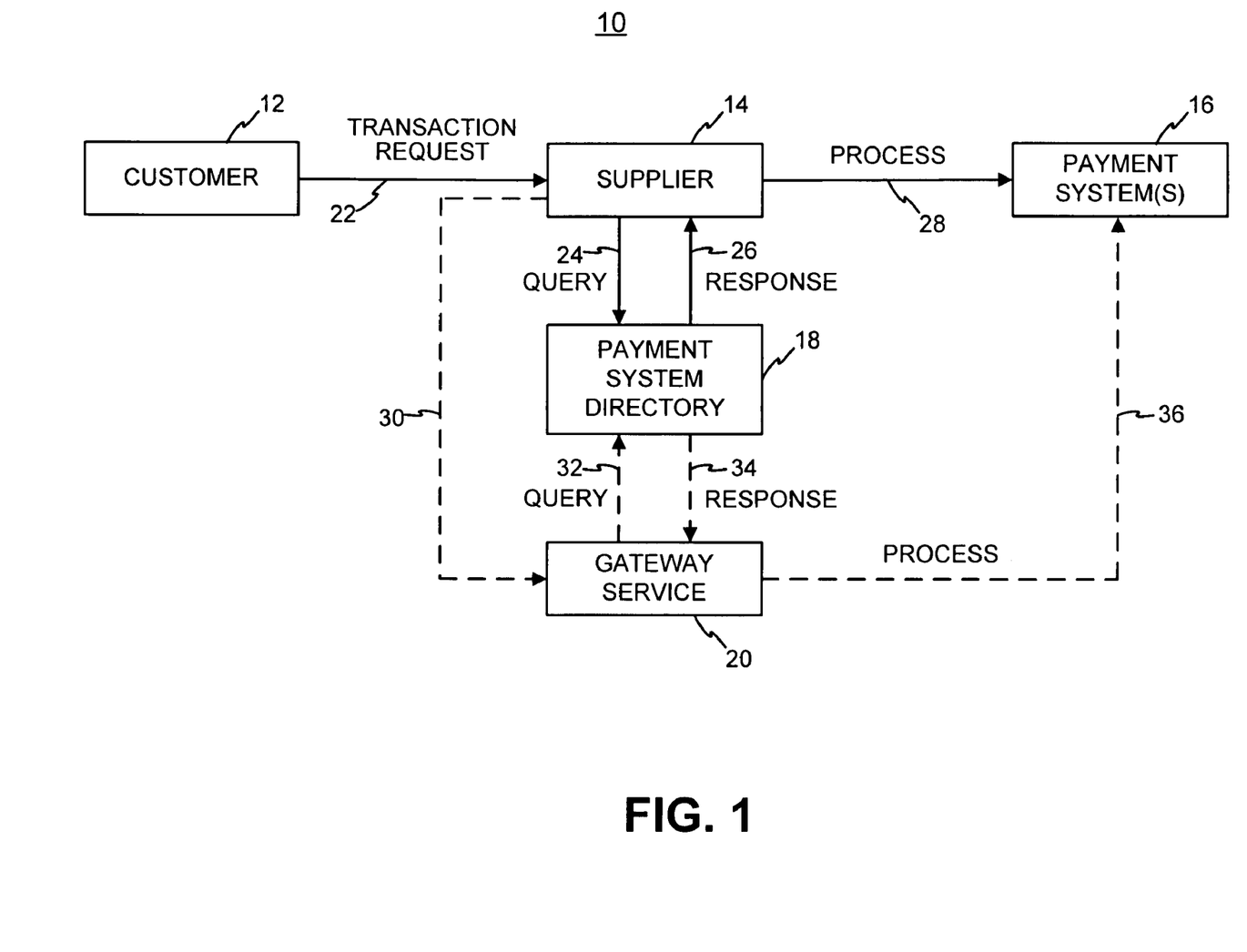
FIG. 1 is a schematic diagram illustrating an exemplary system and method for dynamically locating and interacting with payment systems to process requests for purchase of item.

FIG. 1 is a diagram illustrating an exemplary system 10 for implementing embodiments to dynamically locate and interact with payment systems. In system 10, a customer 12 transmits a transaction request with payment criteria (22) to a supplier 14 to request purchase of an item. The request may include, for example, an identification of the desired item, and information identifying the customer. Supplier 14 is configured to query (24) a payment system directory 18 to identify (26) appropriate payment systems to process the transaction. Supplier 14 is configured to then fully or partially process (28) the transaction by communicating with one or more payment systems 16.

Alternatively, supplier 14 transmits (30) the information for the request to a gateway service 20, which may then query (32) payment system directory 18 to identify (34) payment systems for processing the request. Once the appropriate payment systems are identified, gateway service 20 may communicate (36) with one or more payment systems 16 to fully or partially process the request for the customer.

The payment system directory 18 may determine candidate payment systems based on a number of factors. These factors may include attributes contained in the service request such as, for example, supplier identity, customer identity, payment instrument(s) selected by the customer, strength of customer authentication method, transaction amount, type of product being purchased, product delivery channel, supplier risk tolerance, and/or desired payment terms. Other decision factors external to the transaction itself may also be considered, such as, for example, payment system availability and pre-configured preferences such as optimal price, optimal response attributes, and contractual obligations with respect to transaction distribution arrangements, and volumes. In this latter case, where the consumer has made contractual volume obligations in return for a discount, the payment system directory may provide a system and method to track and report back transaction history. Still other factors include those related to payment criteria, examples of which are provided above.

Because a supplier is unlikely to have an existing business relationship with many of the payment systems located by the payment system directory, it may be desirable for the supplier to enter into an "on-the-fly" contract with the payment system to facilitate financial settlement. The payment system directory may locate more than one candidate payment system for a transaction, and the supplier may select a payment system based on terms agreed upon in an on-the-fly contract negotiation. In some cases, the payment system may request that the supplier maintain funds in an escrow account to cover potential chargebacks resulting from customer disputes. A supplier who negotiates a contract on-the-fly may also opt to designate the agreement as being in force for all transactions from that date forward, or until additional custom rules are defined, or another contract is established through other channels. In addition, a supplier may elect to process initial transactions with a payment system without having a contract and then require a contract after a certain number of transactions.

In the exemplary embodiments, a payment system may specify the forms of customer authentication requested in its terms. If the supplier does not possess the customer authentication information requested by a specific payment system, the supplier may need to initiate the desired customer authentication process. Once the customer has been authenticated, the supplier continues the transaction with the payment system or gateway service. The system may support varied transaction fees based on, for example, the strength of authentication designated.

Further, the supplier may negotiate the final purchase price or other terms with the customer based upon the different terms of the candidate payment systems available for the transaction. The customer may prefer to use a particular payment system, for example, even if doing so results in a slightly higher final purchase price (one example of this would be the case where the customer has enrolled in a loyalty program with the particular processor).

In the exemplary embodiments, the payment instrument used by the customer need not be a credit card, and the payment system need not be a traditional bank. For example, the payment system may be the customer's cable company, which has an established relationship with the customer and is capable of absorbing loss. Therefore, payment instruments may include a financial component, a non-financial component, or both.

In another example, the payment system directory may locate a specialized micro-payments processor that specifically interacts with low or high value purchases. The micro-payments processor may offer reduced transaction processing costs relative to traditional payment systems. Some processors may also be specifically designated to accept specific financial instruments, such as a stored value transaction device.

The payment system may be managed by, for example, an issuing bank, acquiring bank, third-party processor, payment aggregator, consortium network, or payment gateway. The payment system directory may allow identification on a world-wide basis, serving as a single or reduced point for submitting all payments requests.

System for Payment Process

Figure 2:
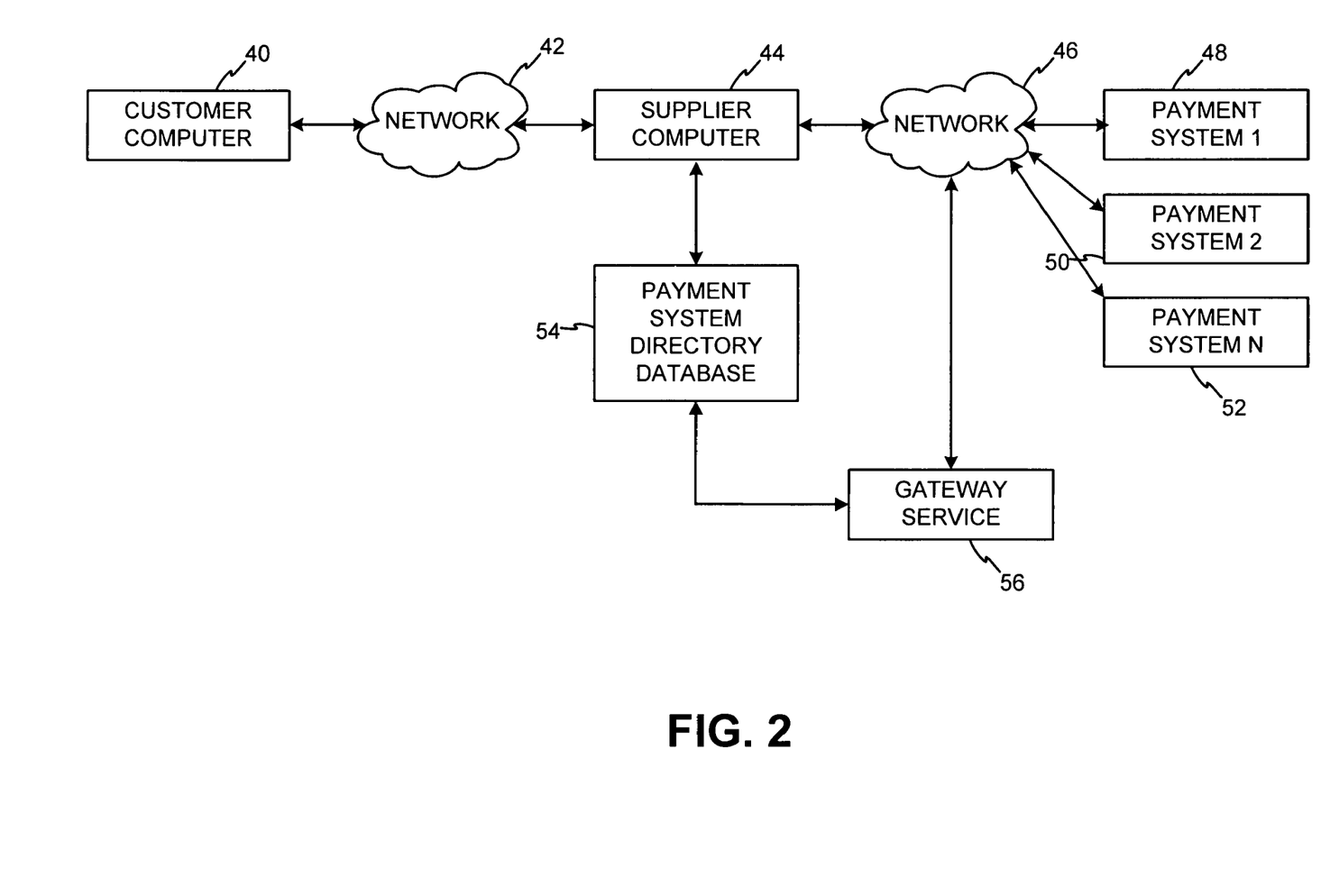
FIG. 2 is a schematic diagram of an exemplary system for processing requests for the purchase of an item.

FIG. 2 is a schematic diagram of a system which facilitates processing requests for the purchase of an item in accordance with exemplary embodiments. A customer computer 40 may interact with a supplier computer 44 via a network 42, which may include any type of wireline or wireless network for data communication. Supplier computer 44 may contact a payment system directory database 54, located either locally or remotely, to identify payment systems for processing transactions. Once supplier computer 44 has identified payment systems for processing a particular transaction, it may communicate with one or more payment systems 48, 50 and 52 via a network 46 to process the transaction for a customer. Network 46 may include any type of wireline or wireless network for data communication.

Three payment systems are shown for illustrative purposes only, and other systems may use more or fewer payment systems. The payment systems which may be part of certain transactions may represent existing proprietary networks that presently accommodate transactions for credit cards, debit cards, and other types of financial/banking cards. Exemplary transaction networks may include the American Express®, VisaNet® and the Veriphone® networks.

As an alternative, supplier computer 44, via network 46, may transmit information for the transaction to a gateway service 56, which may then process the transaction by querying payment system directory database 54 and communicating with the appropriate payment systems. The gateway service 56 may also be implemented with, for example, a programmed computer. The computers shown may communicate with each other via the networks using, for example, Internet Protocol addresses or other methods of locating an entity via a communications network.

Figure 3:
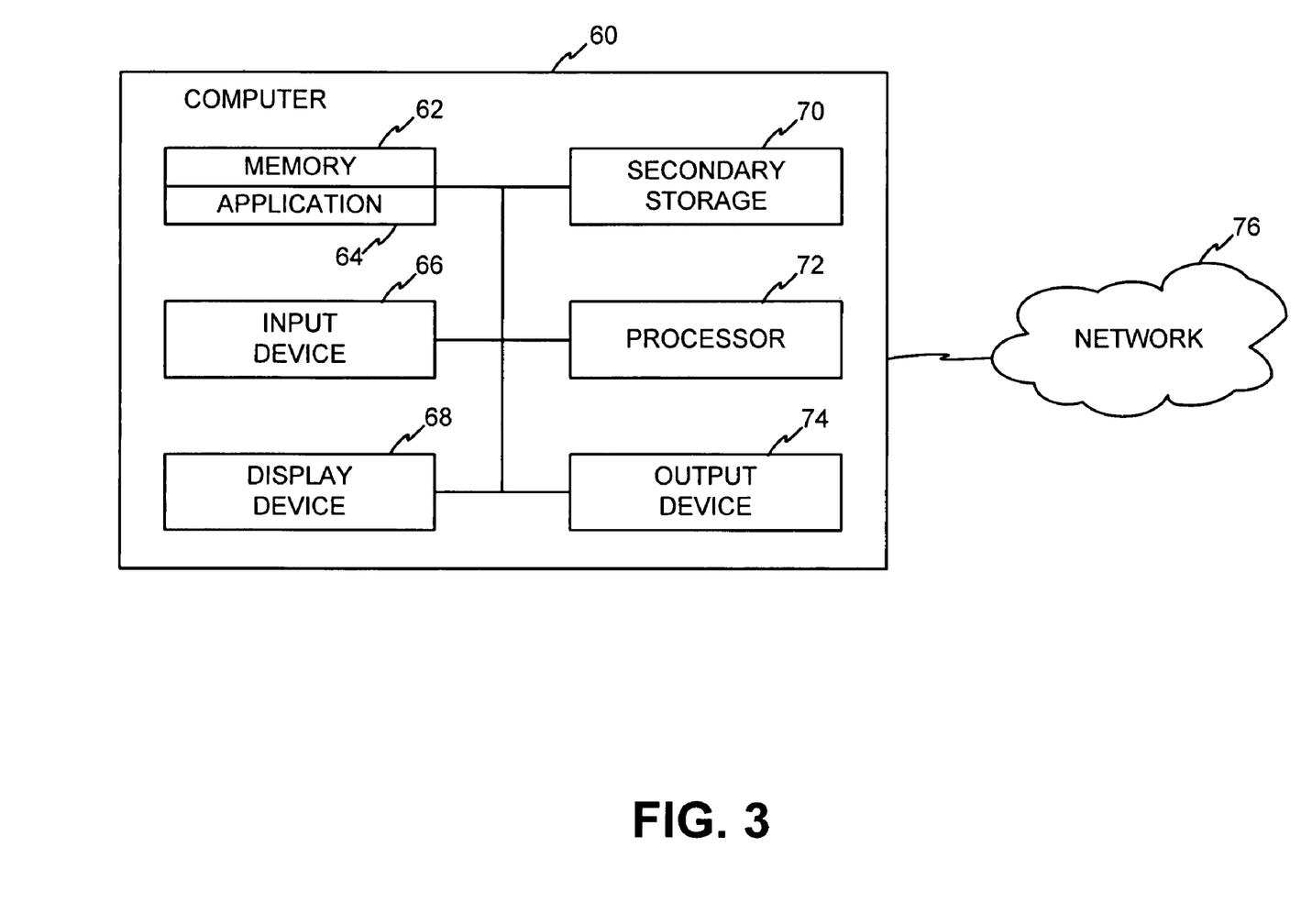
FIG. 3 is a schematic diagram of exemplary components of computers used in the system.

FIG. 3 is a schematic diagram of an exemplary computer 60 illustrating typical components of the computers shown in FIG. 2 for the system. Computer 60 may include a connection with a network 76 as the Internet or communications networks through any suitable network connection. Computer 60 typically includes a memory 62, a secondary storage device 70, a processor 72, an input device 66 for entering information into computer 60, a display device 68 for providing a visual display of information, and an output device 74 for outputting information such as in hard copy or audio form.

Memory 62 may include random access memory (RAM) or similar types of memory, and it may store one or more applications 64 for execution by processor 72. Applications 64 may include programming to perform the methods discussed herein such as, for example, dynamically locating and using payment systems.

Secondary storage device 70 may include any hardware and/or software for storing data such as, for example, a hard disk drive, floppy disk drive, CD-ROM drive, or other types of non-volatile data storage. Processor 72 may execute applications or programs stored in memory 62 or secondary storage 70, or received from the Internet or other network 76. Although computer 60 is depicted with various components, one skilled in the art will appreciate that the computer may contain different components.

Computer 60 may include local or remote databases for storing and retrieving information for processing transactions, including payment system directory database 54. Any databases discussed herein may be any type of database, such as relational, graphical, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The system, as shown in FIG. 2, may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that may be used in association with the present invention. As those skilled in the art may appreciate, user computer may typically include an operating system (e.g., Windows NT, 95/98/2000, Linux, Solaris, etc.) as well as various conventional support software and drivers typically associated with computers. User computer may be in a home or business environment with access to a network. In an exemplary embodiment, access is through the Internet through a commercially-available web-browser software package.

Communication between the parties to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art may also appreciate that, for security reasons, any databases, systems, or components of the present invention may include any combination of databases or components at a single location or at multiple locations, wherein each database or system includes any of various suitable security features, such as firewalls, access codes, encryption, de-encryption, compression, decompression, and/or the like.

The computers discussed herein may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system.

It may be appreciated, that many applications of the present invention may be formulated. One skilled in the art may appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention may be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention may also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center may maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system may also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Methods for Payment Processing

Figure 4:
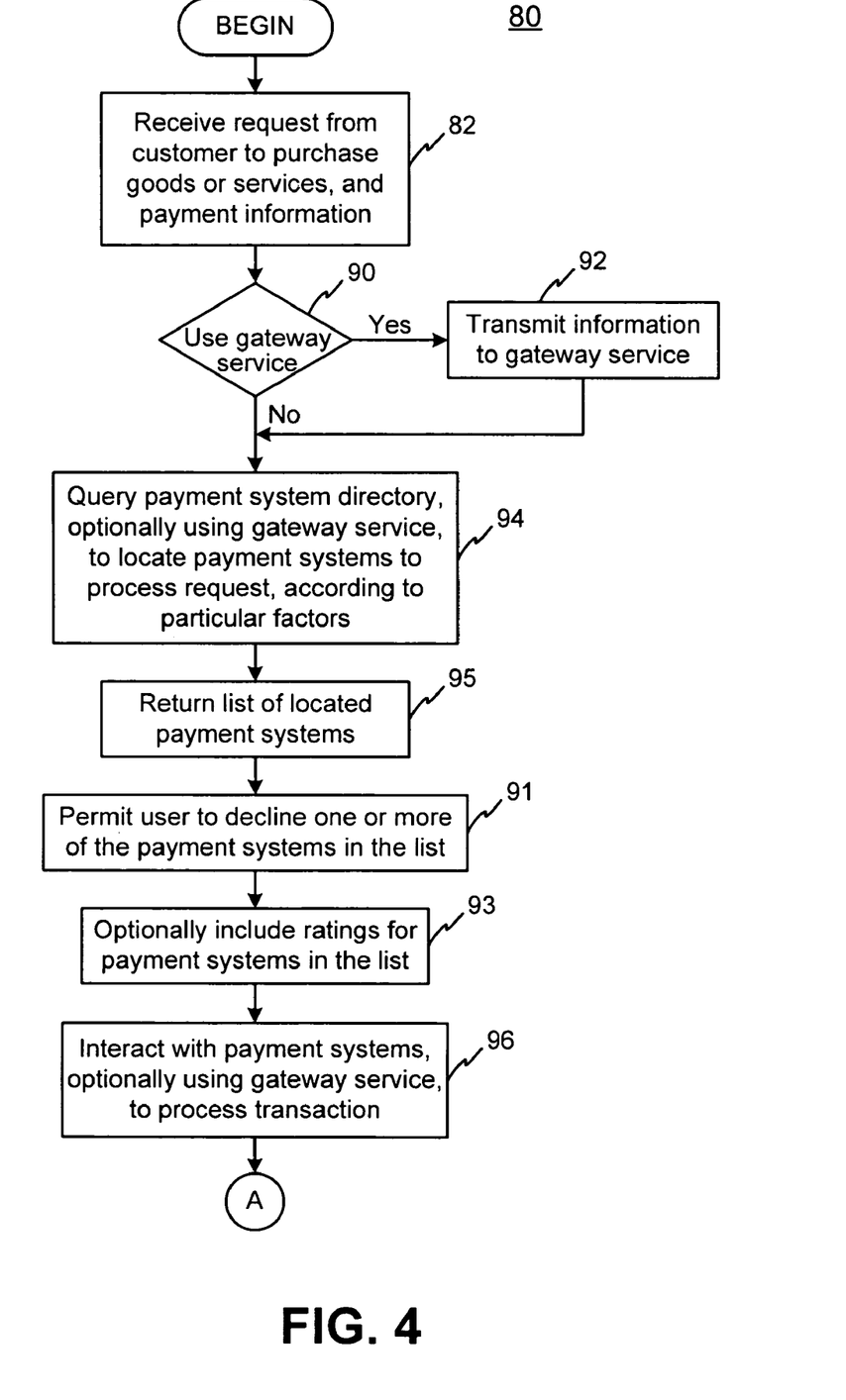
FIGS. 4 and 5 include flow charts of an exemplary method to dynamically locate and interact with payment systems to process requests for purchase of an item.
Figure 5:
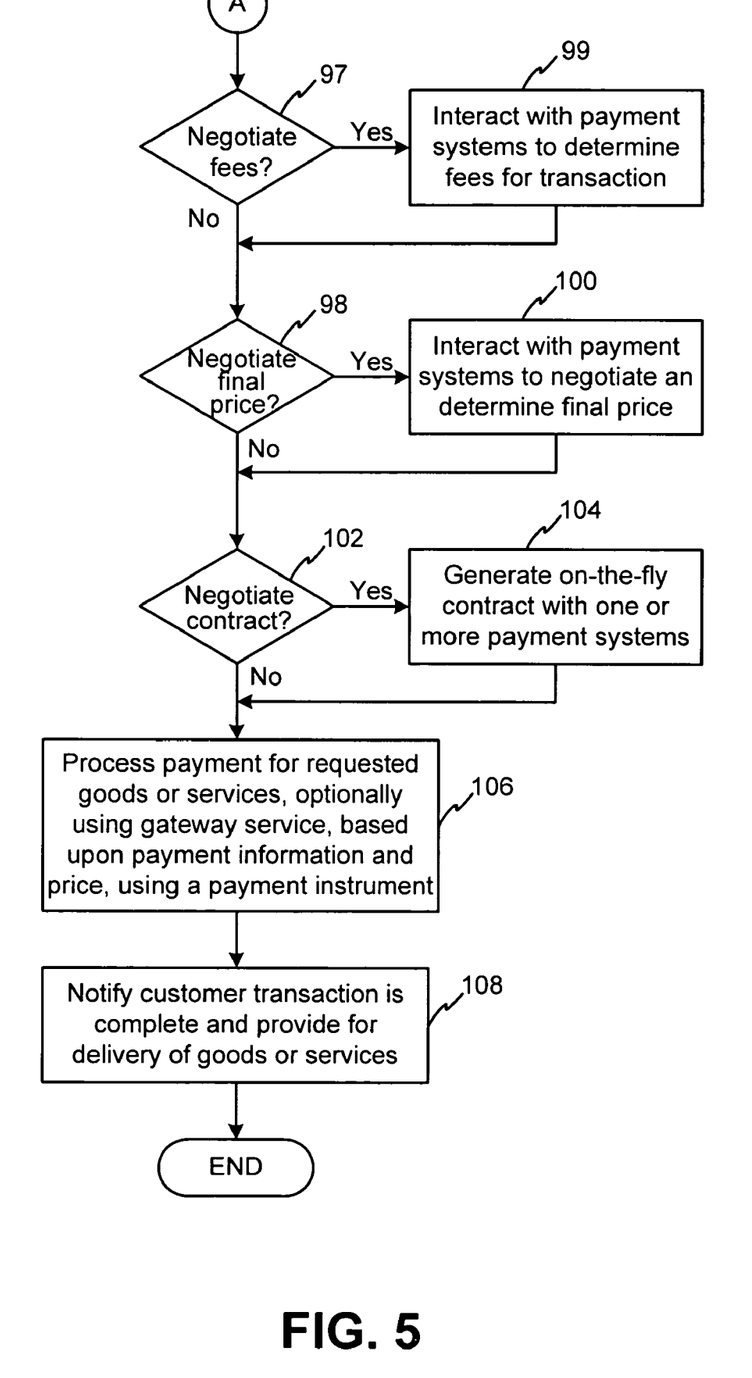

FIGS. 4 and 5 disclose a flow chart of an exemplary method 80 to dynamically locate and interact with payment systems to facilitate processing requests for purchase of an item. Method 80 may be implemented in, for example, software modules for execution by supplier computer 44, gateway service 56, and payment systems 48, 50, and 52. Although the steps of method 80 are shown in a particular order, they may alternatively be executed in other orders and more steps may be added or steps removed, if necessary or desired.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It may be understood that each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It may also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions.

In method 80, supplier computer 44 via network 42 receives a request from a customer, at customer computer 40, to purchase an item along with payment criteria (step 82). The request can potentially include user preferences for use in locating one or more payment systems to process the request. Also, the request may be in any particular format for network transmission and sent according to any suitable protocol. The request may be sent, for example, via a web page, or other on-line or network communication.

The request may be received from a user or other person, for example, at the requesting entity. As used herein, the term "end user", "consumer", "customer", "supplier", "cardmember", "business" or "merchant" may be used interchangeably with each other, and each shall mean any person, entity, machine, hardware, software or business. The card issuing institutions may include credit card companies, card sponsoring companies, or third party issuers under contract with financial institutions. It is further noted that other participants may be involved in some phases of the transaction, such as an intermediary settlement institution, but these participants are not shown.

The request for a transaction may optionally include an account number. An "account number", as used herein, may include any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, a bank routing and account number, other identification code, and/or the like which is optionally located on a rewards card, charge card, credit card, debit card, prepaid card, telephone card, smart card, magnetic stripe card, bar code card, transponder, radio frequency card and/or the like. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

Supplier computer 44 may authenticate the user's identity may authenticate the user's identity at various points in the processing of method 80 or as part of the payment criteria. The authentication may use, for example, any particular authentication methods, to help prevent fraudulent transactions.

Supplier computer 44 may determine whether to use gateway service 56 (step 90) and, if so, it may transmit information related to the request to gateway service 56 (step 92). An advantage of using the gateway service includes, for example, not necessarily requiring that the supplier know the locations and protocols of all the payment systems. With the gateway service, therefore, a supplier may have access to more payment systems. Supplier computer 44, or gateway service 56, then queries payment system directory database 54 to locate one or more payment systems suitable for processing the transaction (step 94), and returns a list identifying zero or more located payment systems suitable for processing the transaction (step 95). The payment systems can potentially be identified by routing information so that the system can interact with them via a network. The system can permit a user to decline one or more of the identified payment systems presented to the user in the list (step 91). Also, the system can optionally include ratings indicating how closely each of the payment systems match the criteria (step 93).

The determination of locating the payment systems may be based upon a number of factors such as those described above. In particular, supplier computer 44, or gateway service 56, can determine which payment systems match the payment criteria using, for example, business rules, quality of service criteria, or fuzzy logic technology. The payment criteria can be expressed as, for example, codes or other identifiers, and the payment systems can be identified by name, network location, and various attributes relating to how they process payments. In addition, the payment criteria can use weighted factors to emphasize or de-emphasize each individual factor.

Supplier computer 44, or gateway service 56, interacts with the identified payment system(s) to process the transaction (step 96). It can select payment systems by generating, for example, a score for various payment systems indicating for each one how closely it matches the payment criteria. If two or more payment systems have the same score, the system may apply additional criteria or present options to the customer in order to make a final selection of payment systems.

The processing may optionally include negotiating fees for the transaction. If this feature is used (step 97), supplier computer 44, and/or gateway service 56, may interact with the payment systems to negotiate fees for the transactions (step 99). The negotiation for fees can be based upon any factors or payment criteria. The processing may also optionally include negotiating a final price for the requested item. If this feature is used (step 98), supplier computer 44, and/or gateway service 56, may interact with the payment systems to determine a final price for the requested goods or service (step 100). This price negotiation feature may be used, for example, if the requesting customer desires to attempt to obtain a lower price, or if the requested items do not have a set price.

The processing may also optionally include negotiating a contract for the requested items. If this feature is used (step 102), supplier computer 44, and/or gateway service 56, may interact with the payment systems to generate an on-the-fly contract for purchase of the requested goods or service (step 104). This contract negotiation feature may be used, for example, if the supplier does not have an established relationship with a particular payment system and a contract is necessary to use it. Also, in some instances the customer already has a contract with a supplier, or can be supplied with a contract, to use particular types of on-line payment systems such as, for example, the PayPal system (www.paypal.com). The supplier or gateway service may use that arrangement as one of the payment criteria in attempting to select a payment system with whom the customer already has a relationship or contract. It can also be used to negotiate a final price by offering different prices based upon whether the customer is willing to enter into contracts relating to use of particular payment systems.

Supplier computer 44, or gateway service 56, processes payment for the requested item based upon the payment criteria and price, using a payment instrument (step 106). The payment instruments may include a financial component, a non-financial component, or both. The payment processing occurs through the located payment systems and may include, for example, conventional systems and financial networks to obtain payment from the customer.

The system may notify the customer that the transaction is complete once processing is finished or any other status update during the process, and arrange for delivery of the purchased item to the customer (step 108). The supplier may notify the customer. Alternatively, the notification may be sent from a merchant providing the item to the customer, and such notification can be provided by, for example, an e-mail, letter, or phone call.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

The invention claimed is:

1. A method for identifying payment systems for facilitating the processing of payments comprising:
   receiving, by a computer based system for identifying the payment systems, payment criteria, wherein the payment criteria is transmitted by a customer to the computer based system;
   querying, by the computer based system, a directory of payment systems in an attempt to locate a payment system to process the transaction based at least in part upon the received payment criteria, wherein the querying is not performed by an acquiring bank; and
   returning, by the computer based system, an identification of the located payment system to process the transaction, wherein the returned identification includes rating information indicating the amount of matching between the located payment system and the payment criteria.

2. The method of claim 1, further including interacting with the located payment system to at least partially process the transaction using the payment criteria.

3. The method of claim 2, wherein the querying includes selecting the payment system based upon attributes of the transaction.

4. The method of claim 2, wherein the querying includes selecting the payment system based upon one or more of the following: a supplier identity; a customer identity; a payment instrument selected by the customer; a strength of an authentication method for the customer; an amount of the purchase; a type of item being purchased; a delivery channel for the item;
   a supplier risk tolerance; desired payment terms; an availability of the payment systems; an optimal price for the item; optimal response attributes; contractual obligations with respect to transaction distribution arrangements for the item; specialists that handle specific classes or types of goods or services; a payment instrument; a payment currency; taxes related to payment of the item; or fees associated with payment of the item.

5. The method of claim 2, wherein the interacting includes processing the transaction using a transaction account that includes a financial component or a non-financial component.

6. The method of claim 1, further including authenticating an identification of the customer.

7. The method of claim 1, further including negotiating with the payment system a price for the item or associated fees.

8. The method of claim 1, further including permitting the customer to decline the payment system.

9. The method of claim 1, further including identifying the payment system by corresponding routing information.

10. A computer based system, comprising:
    a computer network communicating with a memory;
    the memory communicating with a processor; and
    the processor, when executing a computer program for identifying payment systems for facilitating the processing of payments by a gateway service, is configured to:
       receive payment criteria, wherein the payment criteria is transmitted by a customer to the computer based system;
       query a directory of payment systems in an attempt to locate a payment system to process the transaction based at least in part upon the received payment criteria, wherein the querying is not performed by an acquiring bank; and
       return an identification of the located payment system to process the transaction, wherein the returned identification includes rating information indicating the amount of matching between the located payment system and the payment criteria.

11. The computer based system of claim 10, further configured to interact with the located payment system to at least partially process the transaction according to the payment criteria.

12. The computer based system of claim 11, wherein the query includes selecting the payment system based upon attributes of the transaction.

13. The computer based system of claim 11, wherein the query includes selecting the payment system based upon one or more of the following: a supplier identity; a customer identity; a payment instrument selected by the customer; a strength of an authentication method for the customer; an amount of the purchase; a type of item being purchased; a delivery channel for the item; a supplier risk tolerance; desired payment terms; an availability of the payment systems; an optimal price for the item; optimal response attributes; contractual obligations with respect to transaction distribution arrangements for the item; specialists that handle specific classes or types of goods or services; a payment instrument; a payment currency; taxes related to payment of the item; or fees associated with payment of the item.

14. The computer based system of claim 11, wherein the interacting step includes processing the transaction using a transaction account that includes a financial component or a non-financial component.

15. The computer based system of claim 10, further configured to enter into a contract with the payment system for processing of the transaction.

16. The computer based system of claim 10, further configured to authenticate an identification of the customer.

17. The computer based system of claim 10, further configured to negotiate with the payment system a price for the item or associated fees.

18. The computer based system of claim 10, further configured to permit the customer to decline the payment system.

19. A non-transitory computer-readable medium having stored thereon a plurality of instructions for identifying the payment systems, the plurality of instructions, when executed by a processor, are configured to cause the processor to perform operations comprising:
    receiving payment criteria, wherein the payment criteria is transmitted by a customer to the supplier;
    querying a directory of payment systems in an attempt to locate a payment system to process the transaction based at least in part upon the received payment criteria, wherein the querying is not performed by an acquiring bank; and returning an identification of the located payment system, if any, to process the transaction, wherein the returned identification includes rating information indicating the amount of matching between the located payment system and the payment criteria.

20. The medium of claim 19, wherein the plurality of instructions further include selecting the payment system based upon preferences of the customer.

* * * * *

UNITED STATES PATENT AND TRADEMARK OFFICE
CERTIFICATE OF CORRECTION

PATENT NO. : 7,908,215 B2  
APPLICATION NO. : 10/728279  
DATED : March 15, 2011  
INVENTOR(S) : David Armes et al.

Page 1 of 1

It is certified that error appears in the above-identified patent and that said Letters Patent is hereby corrected as shown below:

On the Title page, item (60) Related U.S. Application Data, insert therefor --Continuation in Part of application No. 10/611,034 filed on June 30, 2003--.

Signed and Sealed this  
Third Day of May, 2011

David J. Kappos  
*Director of the United States Patent and Trademark Office*